(12) United States Patent
Barberis et al.

(10) Patent No.: US 10,171,359 B2
(45) Date of Patent: Jan. 1, 2019

(54) CELLULAR NETWORK WITH CONTROL PLANE DECOUPLED FROM USER PLANE

(71) Applicant: TELECOM ITALIA S.p.A., Milan (IT)

(72) Inventors: Sergio Barberis, Turin (IT); Giorgio Calochira, Turin (IT); Flavio Muratore, Turin (IT); Andrea Schiavoni, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 69 days.

(21) Appl. No.: 15/106,702

(22) PCT Filed: Dec. 20, 2013

(86) PCT No.: PCT/EP2013/077716
§ 371 (c)(1),
(2) Date: Jun. 20, 2016

(87) PCT Pub. No.: WO2015/090453
PCT Pub. Date: Jun. 25, 2015

(65) Prior Publication Data
US 2016/0337242 A1 Nov. 17, 2016

(51) Int. Cl.
*H04L 12/801* (2013.01)
*H04W 72/08* (2009.01)
(Continued)

(52) U.S. Cl.
CPC .............. *H04L 47/12* (2013.01); *H04L 41/06* (2013.01); *H04W 16/32* (2013.01); *H04W 24/04* (2013.01); *H04W 72/085* (2013.01); *H04W 88/04* (2013.01)

(58) Field of Classification Search
None
See application file for complete search history.

(56) References Cited

U.S. PATENT DOCUMENTS

| 2010/0246462 A1 | 9/2010 | Lindgren et al. |
| 2011/0189997 A1* | 8/2011 | Tiwari ................ H04W 36/00 455/443 |

(Continued)

FOREIGN PATENT DOCUMENTS

| WO | 2009/031956 A1 | 3/2009 |
| WO | WO 2014/149921 A1 | 9/2014 |

OTHER PUBLICATIONS

"Connectivity Models for Small Cell Enhancement", LG Electronics Inc., 3GPP TSG-RAN WG2 #81, R2-130314, (8 pages), XP050668059, Feb. 2013.

(Continued)

*Primary Examiner* — Candal Elpenord
(74) *Attorney, Agent, or Firm* — Oblon, McClelland, Maier & Neustadt, L.L.P.

(57) ABSTRACT

A cellular network is provided. The cellular network includes a plurality of control plane transceiver stations, each one configured to provide radio coverage over a corresponding first coverage area for allowing user equipment within said first coverage area to exchange signaling traffic with the control plane transceiver station. For each control plane transceiver station, the cellular network further comprises one or more hybrid transceiver stations located within the corresponding first coverage area. Each hybrid transceiver station is configured to be switched between: a) a user operation modality that allows user equipment within said user coverage area to exchange user traffic with the hybrid transceiver station, and b) a control operation modality that provides radio coverage over a corresponding control coverage area for allowing user equipment within said control coverage area to exchange at least signaling traffic with the hybrid transceiver station.

11 Claims, 3 Drawing Sheets

(51) Int. Cl.
H04W 24/04 (2009.01)
H04L 12/24 (2006.01)
H04W 16/32 (2009.01)
H04W 88/04 (2009.01)

(56) References Cited

U.S. PATENT DOCUMENTS

| | | | | |
|---|---|---|---|---|
| 2013/0329583 A1* | 12/2013 | Vrzic | ............ | H04W 36/30 |
| | | | | 370/252 |
| 2014/0073335 A1* | 3/2014 | Panchal | ............ | H04W 4/00 |
| | | | | 455/450 |
| 2014/0153390 A1* | 6/2014 | Ishii | ............ | H04W 28/0289 |
| | | | | 370/230 |
| 2014/0233413 A1* | 8/2014 | Dahod | ............ | H04N 21/6131 |
| | | | | 370/252 |
| 2014/0269632 A1* | 9/2014 | Blankenship | ....... | H04W 76/025 |
| | | | | 370/336 |
| 2015/0163041 A1* | 6/2015 | Kodali | ............ | H04L 1/1812 |
| | | | | 370/252 |

OTHER PUBLICATIONS

"Further discussion on potential issues of dual connectivity", CATR, 3GPP TSG RAN WG2 #81 Bis, R2-131314, (4 pages). XP050699321, Apr. 2013
International Search Report dated Oct. 6, 2014 for PCT/EP2013/077716 filed on Dec. 20, 2013.
European Office Action dated Jan. 24, 2018 in Patent Application No. 13 818 744.8, 7 pages.

* cited by examiner

CELLULAR NETWORK WITH CONTROL PLANE DECOUPLED FROM USER PLANE

BACKGROUND OF THE INVENTION

Field of the Invention

The present invention generally relates to wireless communication networks, such as cellular networks.

Overview of the Related Art

Evolution of cellular networks has experimented a significant growth in terms of spread and performance, and has recently brought inside 3GPP ("Third Generation Partnership Project") to the definition of LTE ("Long Term Evolution")/LTE-Advanced.

3GPP LTE/LTE-Advanced standard is conceived for allowing data to be high-speed conveyed between a fixed-location transceiver base station or node (e.g., eNodeB) radiating radio waves over a respective coverage area (cell) and user equipment (e.g., user terminals, such as cellular phones) within the coverage area.

Presently, cellular networks are seeing an increase in terms of number of new users and data throughput requirements. The ever increasing availability of new advanced user equipment, such as smartphones and tablets, has made available to the end users a huge number of client applications, many of them causing a frequent transmission and reception of data.

This implies that cellular networks should manage an ever increasing amount of signaling information. As it is known to those skilled in the art, with signaling information (or simply "signaling") it is intended the information exchanged among user equipment and nodes of the cellular networks to ensure that user equipment are correctly linked to the cellular network. Signaling information concerns establishment, control and managing of the connection between a user equipment and the network, in contrast to user information, which concerns the actual content data exchanged between the user equipment and the network based on the specific type of service requested by the user equipment. The signaling information traffic increasing is caused by several factors, such as for example the "always-on" IP-connectivity required by smartphones, tablets and generally modern mobile devices, the widespread availability of applications for mobile devices ("Apps") which require very frequent periodic updates, and the growth of machine-to-machine (M2M) devices.

As disclosed for example in Section 7.2, page 134 of "*Introduction to 3G mobile communications*" by Juha Korhonen, Artech House, $2^{nd}$ edition, 2003, a cellular network may be regarded as formed by two sections, referred to as control plane (briefly, "C-plane") and user plane (briefly, "U-plane"). The C-plane is the section of the cellular network mainly directed to manage the signaling information traffic, while the U-plane is the section of the cellular network that is mainly directed to manage the user information traffic.

In current cellular networks, signaling information traffic (or simply "signaling traffic") and user information traffic (or simply "user traffic") are usually managed as a single entity. In this case, the separation between the C-plane and the U-plane mainly occurs at logical level only. Each node of these cellular networks, regardless of the size of its corresponding coverage area, is configured to manage—within its coverage area and for each user equipment in said coverage area—both signaling and user traffic. Therefore, signaling information and user information may be transmitted/received by a same network node, for example by exploiting different time and/or frequency resources.

In order to improve the efficiency and the reliability of the cellular networks, studies have been recently carried out to provide network architectures in which the C-plane and the U-plane are decoupled both at logical and physical levels, to allow that signaling traffic travels separated from user traffic. For the sake of brevity, a cellular network of this type will be now on referred to as "decoupled network". The nodes of a decoupled network may belong to a first category, associated to the C-plane, or to a second category, associated to the U-plane. The nodes of the first category, also referred to as "C-plane nodes"—usually implemented by the macro nodes of the network—are responsible for the C-plane coverage, and are specialized to manage signaling traffic. The nodes of the second category, also referred to as "U-plane nodes"—usually implemented by the small nodes of the network—are instead responsible for the U-plane coverage, and are specialized to mainly manage user traffic. The coverage area size of each C-plane node is in general larger than the coverage area size of each U-plane node. The coverage areas of all the C-plane nodes of the decoupled network cover (with possible overlapping) portions of the territory in which the decoupled network is located. U-plane nodes are located within the coverage area of each C-plane node of the decoupled network, with the coverage areas of said U-plane nodes that cover (with possible overlapping) at least portions of the territory covered in turn by the coverage area of the corresponding C-plane node. From now on, when a user equipment is said to be within the coverage area of a C-plane node, it means that said user equipment is under the control of said C-plane node and is capable of exchanging signaling traffic therewith. Similarly, when a user equipment is said to be within the coverage area of a U-plane node, it means that said user equipment is in condition to establish a link to said U-plane node and is capable of exchanging user traffic therewith.

The decoupling between the C-plane and the U-plane coverage has been considered as a potential solution within the "Small Cells Enhancements" Study Item of the 3GPP Release 12 specification activity. In 3GPP context, several contributions have been produced by 3GPP members proposing slightly different views on this issue.

For example, in order to provide high throughputs in a flexible and energetically efficient way, in the document RWS-120019, "LTE Release 12 and Beyond" (3GPP RAN WS on Rel-12 and onwards, Ljubljana, Slovenia, 11-12 Jun. 2012) it is proposed the introduction of so-called "Phantom Cells" operating on a high frequency carrier (in the proposed example, at 3.5 GHz) and dedicated to serve the U-plane, leaving the management of the C-plane to macro cells having wider coverage areas. The actual degree of separation between the C-plane and the U-plane obtainable with said architecture is currently under discussion (see for example R2-131329, "Necessity of C-plane architecture enhancements for dual connectivity", 3GPP TSG-RAN2 #81bis, Chicago, USA, 15-19 Apr. 2013).

Similar solutions have been proposed in the document RWS-120003, "LTE Release 12 and Beyond" (3GPP RAN WS on Rel-12 and onwards, Ljubljana, Slovenia, 11-12 Jun. 2012). Said solutions provide for small cells—identified by the terms "Virtual cells" or "Soft Cells"—dedicated to the U-plane that are deployed within the area covered by wider macro cells dedicated to the C-plane. In order to guarantee the off-loading of high volumes of user traffic data with minimal signaling overhead, according to these solutions the small cells exploit carriers (called "booster carriers") for the U-plane different from the carriers (called "anchor carriers") exploited by the macro cells for the C-plane.

According to what proposed in the document RWS-120047, "LTE Release 12 and Beyond" (3GPP RAN WS on Rel-12 and onwards, Ljubljana, Slovenia, 11-12 Jun. 2012), macro cells should be designed to mainly take care of the C-plane, while small cells having smaller coverage area should be designed to improve system capacity mainly taking care of the U-plane and to keep signaling functions for legacy terminals only.

The same concept has been proposed in the document RWS-120006, "Views on Rel-12 and onwards for LTE and UMTS", (3GPP RAN WS on Rel-12 and onwards, Ljubljana, Slovenia, 11-12 Jun. 2012) introducing the concept of "Low Power Nodes". According to this solution, a reference macro cell is designed to give "assistance" to a plurality of low power nodes by means of coordination mechanisms. A similar concept is also proposed in the document RWS-120004, "LTE Release 12 and Beyond", (3GPP RAN WS on Rel-12 and onwards, Ljubljana, Slovenia, 11-12 Jun. 2012). The "Amorphous Cells" introduced in the document RWS-120034, "LTE Release 12 and Beyond", (3GPP RAN WS on Rel-12 and onwards, Ljubljana, Slovenia, 11-12 Jun. 2012) are low power nodes coordinated by macro cells.

EP 2533595 discloses a concept for interference coordination in a heterogeneous network with an apparatus for a mobile transceiver, an apparatus for a macro base station transceiver and an apparatus for a small base station transceiver. The mobile transceiver is adapted for communicating with the macro base station transceiver and is interfered by the small base station transceiver. The mobile transceiver is associated with the macro base station transceiver. The small base station transceiver is configured for denying an association request with the mobile transceiver. The apparatus for the mobile transceiver comprises means for measuring a radio signal transmitted by the small base station transceiver to obtain a small cell measurement result and means for providing information on the small cell measurement result to the macro base station transceiver. The apparatus for the macro base station transceiver comprises means for receiving information on a small cell measurement result from the mobile transceiver, means for determining a subset of the plurality of radio resources to be restricted for the small base station transceiver based on the information on the small cell measurement result and means for communicating information on the subset of radio resources to the small base station transceiver. The apparatus for the small base station transceiver comprises means for obtaining information on a subset of the plurality of radio resources to be restricted for the small base station transceiver from the macro base station transceiver and means for allocating radio resources for data transmission to the mobile transceiver based on the information on the subset of the plurality of radio resources.

U.S. Pat. No. 6,973,054 discloses a method in a communication system of transferring control of a user-plane entity from a first control-plane entity to a second control-plane entity. The user-plane entity sends a set of identifying parameters to the first control-plane entity, which subsequently sends the set of identifying parameters to the second control-plane entity. The second control-plane entity determines if it can control the user-plane entity. If the second control-plane entity can control the user-plane entity, then the second control-plane entity sends an indication to the user-plane entity that a change in control-plane entities has occurred and that at least some resources of the user-plane entity that were controlled by the first control-plane entity are to be controlled by the second control-plane entity. The resources may be allocated to a mobile terminal and the change in control entity may be the result of a change in location of the mobile terminal.

WO2012004663 discloses a method and an eNB for power saving in a heterogeneous network. When the eNB serving the overlay capacity boosting cell does not detect any user equipments accessing the overlay capacity boosting cell, it turns off its downlink transmission; when the eNB serving the overlay capacity boosting cell detects that the user equipment is approaching its coverage area, it turns on its downlink transmission. The eNB serving the overlay capacity boosting cell has two working state, normal transmitting and receiving state, and receiving state, and the eNB serving the overlay capacity boosting cell autonomously turns on and turns off the downlink transmission according to the detecting results of itself, instead of relying on the intervening or indication from the eNB serving the underlay basic coverage cell, so as to achieve the aim of power saving.

WO2012166975 discloses a hybrid user equipment and small-node device data offloading architecture. In this hybrid architecture, the small-node device includes a backhaul link to a telecommunication network and/or the Internet. The user equipment can send and receive data through the small-node device using the backhaul link.

SUMMARY OF INVENTION

The Applicant has recognized that none of the abovementioned prior art decoupled networks is able to efficiently face occurrences of C-plane node malfunctioning, such as a C-plane node congestion or breakdown.

A C-plane node congestion may occur when the number of user equipment in the coverage area of said node becomes unexpectedly large, or when the signaling traffic generated by said user equipment exceeds the C-plane capacity. A C-plane node in a congestion state may not be able to guarantee further signaling traffic increase, manage new incoming user equipment, serve user equipment requiring camping or serve camped user equipment requiring a service, resulting in a denial of service in the coverage area of said C-plane node, or in a portion thereof (e.g., in a sector of the coverage area). Since in a decoupled network the coverage area of a C-plane node is relatively large, a denial of service occurrence in a C-plane node may disadvantageously involve a large number of user equipment.

A C-plane node breakdown may be caused by hardware or software faults in said C-plane node. Following the breakdown of a C-plane node, the coverage area—or a portion thereof, such as the one corresponding to a sector of the coverage area—of said node may become out of service, causing user equipment in said (portion of) coverage area lacking of signaling coverage. In this case, user equipment in idle state cannot establish a connection while user equipment in connection state may lose their connection. In this case as well, since in a decoupled network the coverage area of a C-plane node is relatively large, a large number of user equipment may be disadvantageously involved.

In view of the above, the Applicant has tackled the problem of efficiently and dynamically managing C-plane node malfunctioning in a decoupled network, such as a C-plane node congestion or breakdown.

Applicant has perceived that in a decoupled network, the high number of U-plane nodes can be expediently exploited as an auxiliary resource for the C-plane in case of C-plane nodes malfunctioning. For this purpose, according to embodiments of the present invention, within the C-plane coverage of a C-plane node one or more hybrid nodes are provided, which, when the decoupled network is correctly functioning, operate as typical U-plane nodes, mainly managing user traffic; when instead a C-plane node malfunctioning occurs, creating a "hole" in the C-plane coverage, at least one of said hybrid nodes can be used to substitute or support the functionalities—in terms of signaling management—of the C-plane node wherein the malfunctioning has occurred (hereinafter, simply referred to as "malfunctioning C-plane node"), for covering the hole in the C-plane coverage and thus assuring service continuity.

One or more aspects of the solution according to specific embodiments of the invention are set out in the independent claims, with advantageous features of the same solution that are indicated in the dependent claims, whose wording is enclosed herein verbatim by reference (with any advantageous feature being provided with reference to a specific aspect of the solution according to an embodiment of the invention that applies mutatis mutandis to any other aspect).

More specifically, one aspect of the solution according to one or more embodiments of the present invention relates to a cellular network. The cellular network comprises a plurality of control plane transceiver stations, each one configured to provide radio coverage over a corresponding first coverage area for allowing user equipment within said first coverage area to exchange signaling traffic with the control plane transceiver station. For each control plane transceiver station, the cellular network further comprises one or more hybrid transceiver stations located within the corresponding first coverage area. Each hybrid transceiver station is configured to be switched between:

a) a user operation modality, in which said hybrid transceiver station is configured to provide radio coverage over a corresponding user coverage area for allowing user equipment within said user coverage area to exchange user traffic with the hybrid transceiver station, and b) a control operation modality, in which said hybrid transceiver station is configured to provide radio coverage over a corresponding control coverage area for allowing user equipment within said control coverage area to exchange at least signaling traffic with the hybrid transceiver station.

According to an embodiment of the present invention, said control operation modality comprises a complete-control modality. A hybrid transceiver station in the complete-control modality is configured to cease to provide radio coverage over the corresponding user coverage area, in such a way to cease to allow user equipment within said user coverage area to exchange user traffic with the hybrid transceiver station.

According to an embodiment of the present invention, said control operation modality comprises a shared-control modality. A hybrid transceiver station in the shared-control modality is configured to provide radio coverage over the corresponding control coverage area for allowing user equipment within said control coverage area to exchange at least signaling traffic with the hybrid transceiver station, and at the same time to provide radio coverage over the corresponding user coverage area for allowing user equipment within said user coverage area to exchange user traffic with the hybrid transceiver station.

According to an embodiment of the present invention, a hybrid transceiver station located within the first coverage area of a control plane transceiver station is configured to be switched to the control operation modality when said control plane transceiver station is in a malfunctioning condition.

According to an embodiment of the present invention, said malfunctioning condition comprises a congestion condition in terms of signaling traffic to be managed. A control plane transceiver station in a congestion condition is no more able to:
  guarantee further signaling traffic increasing;
  manage incoming new user equipment;
  serve user equipment requiring camping, or
  serve camped user equipment requiring a service, in at least a portion of its corresponding first coverage area.

According to an embodiment of the present invention, said malfunctioning condition comprises a congestion condition in terms of signaling traffic to be managed. A control plane transceiver station in a congestion condition is no more able to:
  guarantee further signaling traffic increasing;
  manage incoming new user equipment;
  serve user equipment requiring camping, and
  serve camped user equipment requiring a service, in at least a portion of its corresponding first coverage area.

According to an embodiment of the present invention, said malfunctioning condition comprises a breakdown condition. A control plane transceiver station in a breakdown condition is affected by a hardware and/or software fault such to cause that at least a portion of its corresponding first coverage area is out of service.

According to an embodiment of the present invention, each control plane transceiver station is configured to update a corresponding data collection comprising, for each user equipment within its corresponding first coverage area, information relating to the operation condition of said user equipment, and to provide a corresponding portion of said data collection to selected hybrid transceiver stations located within the first coverage area. Before switching to the control operation modality when a control plane transceiver station is in a malfunctioning condition, a selected hybrid transceiver station located within the first coverage area of said control plane transceiver station in a malfunctioning condition is configured to select a subset of user equipment located within the first coverage area of said control plane transceiver station in a malfunctioning condition based on the corresponding portion of said data collection received from said control plane transceiver station in a malfunctioning condition. After being switched to the control operation modality, said selected hybrid transceiver station is configured to exchange at least signaling traffic with the user equipment of said subset.

According to an embodiment of the present invention, the cellular network further comprises for each control plane transceiver station one or more user plane transceiver stations located within the corresponding first coverage area. Each user plane transceiver station is configured to provide radio coverage over a corresponding second coverage area for allowing user equipment within said second coverage area to exchange user traffic with the user plane transceiver station.

According to an embodiment of the present invention, before switching to the complete-control modality, a hybrid transceiver station is configured to start coordination with neighboring control plane transceiver stations and with neighboring hybrid transceiver stations already in the control operation modality to steer user equipment within the user coverage area of said hybrid transceiver station toward neighboring user plane transceiver stations to enable said neighboring user plane transceiver stations to exchange user traffic with said user equipment.

According to an embodiment of the present invention, said one or more hybrid transceiver stations are user plane transceiver stations equipped with software and/or hardware resources selectively operable to exchange at least signaling traffic with user equipment.

BRIEF DESCRIPTION OF THE ANNEXED DRAWINGS

These and other features and advantages of the present invention will be made apparent by the following description of some exemplary and non limitative embodiments thereof; for its better intelligibility, the following description should be read making reference to the attached drawings, wherein.

DETAILED DESCRIPTION OF PREFERRED EMBODIMENTS OF THE INVENTION

Figure 1:
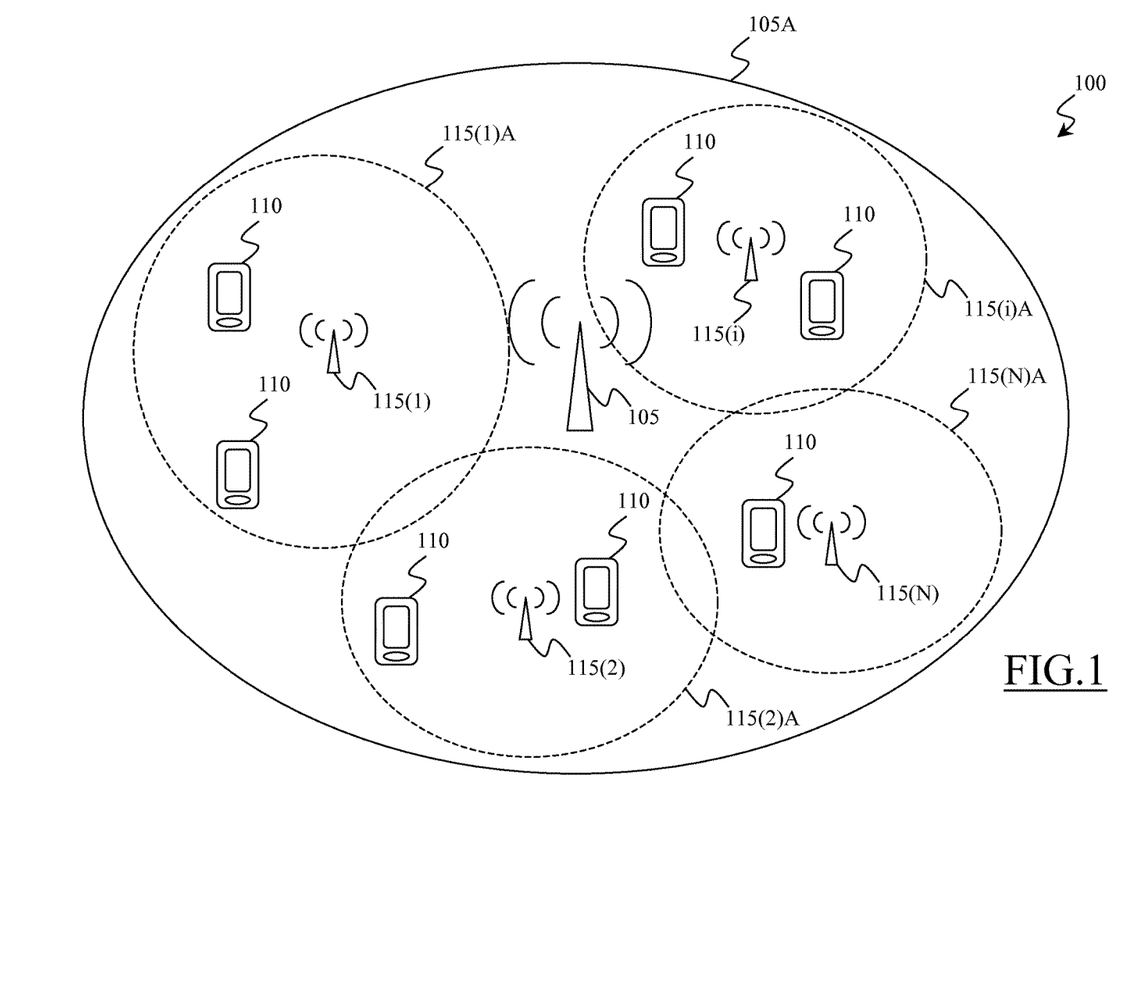
FIG. 1 schematically shows a decoupled network according to a solution known in the art.

With reference to the drawings, a decoupled network 100 according to a solution known in the art is schematically illustrated in FIG. 1. The decoupled network 100 comprises a plurality (only one depicted in the figure) of wide coverage transceiver stations, referred to as C-plane nodes 105. Each C-plane node 105 is configured to provide radio coverage over a relatively wide geographic area, referred to as coverage area 105A, for allowing user equipment 110 (e.g., mobile phones) within the coverage area 105A to exchange signaling traffic with the C-plane node 105. Although not illustrated in the figures, each C-plane node 105 may comprise a set of (e.g., three) antennas, each one configured to provide radio coverage over a portion—referred to as sector—of the coverage area 105A.

As depicted in the figure, the decoupled network 100 also comprises a number N of smaller coverage transceiver stations, referred to as U-plane nodes 115($i$) ($i=1,2,\ldots N$) located within the coverage area 105A of each C-plane node 105. Each U-plane node 115($i$) is typically configured to provide radio coverage over a relatively small geographic area, referred to as coverage area 115($i$)A, for allowing user equipment 110 within the coverage area 115($i$)A to exchange user traffic with the U-plane node 115($i$). The coverage areas 115($i$)A of said U-plane nodes 115($i$) can cover (with possible overlapping) at least portions of the geographic area covered in turn by the coverage area 105A of the corresponding C-plane node 105.

Each C-plane node 105 is configured to carry out in its corresponding coverage area 105A several signaling functions, such as beacon, common signaling management, mobility management, and routing of the user traffic toward the U-plane nodes 115($i$) located within its coverage area 105A. Each C-plane node 105 is also configured to route user traffic to the most suitable U-plane node 115($i$) among those in its coverage area 105A to optimize user experience. Additionally, each C-plane node 105 is configured to manage the signaling traffic pertaining to the user equipment 110 within its coverage area 105A, independently of the technology used by the U-plane nodes 115($i$) to exchange user traffic data. Signaling traffic pertaining to a moving user equipment 110 whose location is crossing the border of the coverage area 105A of a C-plane node 105 is exchanged with an adjacent C-plane node 105 through procedures similar to those of a traditional handover, in this case limited to the signaling traffic. The new C-plane node 105 will then route the user traffic to the most suitable U-plane nodes 115($i$) among those within its coverage area 105A to optimize user experience.

Each U-plane node 115($i$) is configured to handle in uplink and in downlink the user traffic generated by the user equipment 110 within its coverage area 115($i$)A. Additionally, each U-plane node 115($i$) may be able to perform very limited signaling functions, such as for example the ones relating to the power management, the sustenance of the traffic link with the user equipments 110, and/or the acknowledge of messages associated with retransmissions.

The abovementioned decoupled network 100 is a two-level network, with a first level comprising nodes directed to carry out C-plane managing functions (i.e., the C-plane nodes 105), and a second level comprising nodes directed to carry out U-plane managing functions (i.e., the U-plane nodes 115($i$)). However, similar considerations apply if the decoupled network 100 comprises more than two levels, for example a first level comprising wide coverage area nodes directed to carry out C-plane managing functions, a second level comprising medium coverage area nodes directed to carry out U-plane managing functions, and a third level comprising small coverage area nodes directed to carry out U-plane managing functions.

Figure 2:
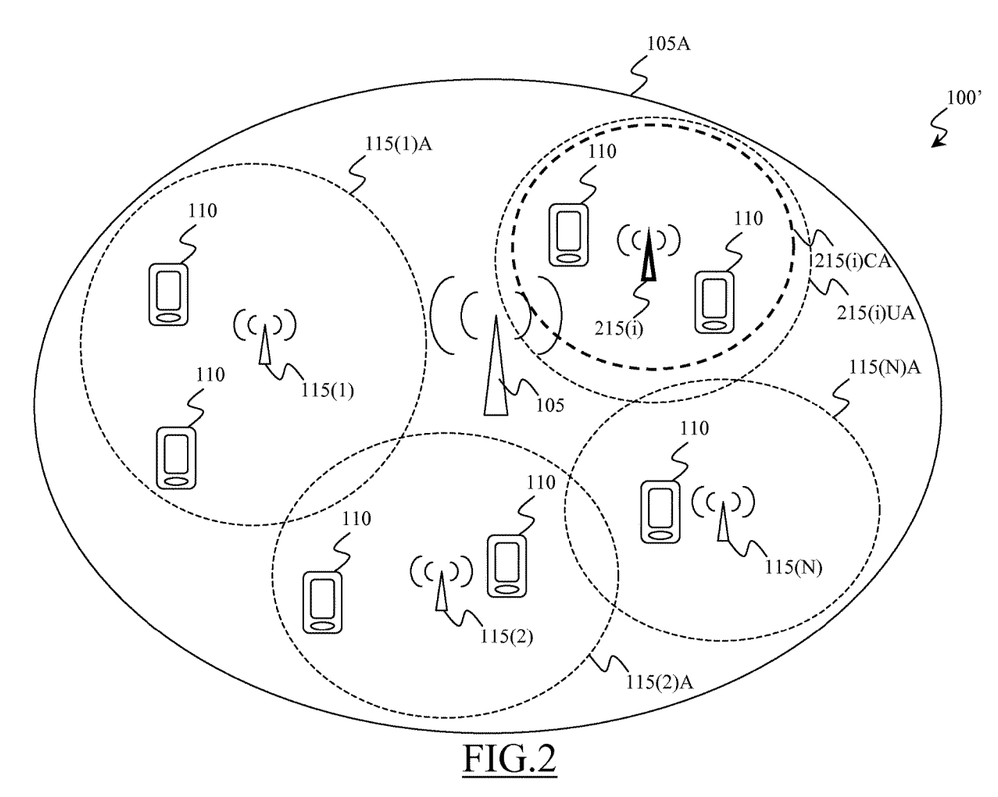
FIG. 2 schematically shows a decoupled network according to an embodiment of the present invention.

FIG. 2 schematically illustrates a decoupled cellular network 100' according to an embodiment of the present invention. The decoupled network 100' according to an embodiment of the present invention differs from the previously described decoupled network 100 in that one or more of the U-plane nodes 115($i$) within the coverage area 105A of each C-plane node 105—referred to as hybrid nodes and identified in FIG. 2 with reference 215($i$)—is equipped with software and hardware resources such to make them capable to carry out (also) C-plane managing functions. In details, according to an embodiment of the present invention, the hybrid nodes 215($i$) are equipped with hardware resources similar to those of the C-plane nodes 105, and/or with reconfigurable software resources, selectively operable to carry out signaling traffic management. According to an embodiment of the present invention, said software resources may be downloaded by the hybrid node 215($i$) from a repository.

The hybrid nodes 215($i$) can be switched between a user modality, in which they act as U-plane nodes for managing user traffic like the U-plane nodes 115($i$) in a respective user coverage area 215($i$)UA, and a control modality, in which they act at least as C-plane nodes for managing the signaling traffic in a respective control coverage area 215($i$)CA so as to temporally substitute or support malfunctioning C-plane nodes 105. In this way, as will be described in detail in the following, in case a C-plane nodes malfunctioning occurs, service continuity is in any case assured by switching one or more hybrid nodes 215($i$) to the control modality.

On this regard, it has to be appreciated that the extent of the user coverage area 215($i$)UA of a hybrid node 215($i$) when in a user modality generally may be different from the extent of the control coverage area 215($i$)CA of the same hybrid node 215($i$) when in the control modality. For example, while in FIG. 2 the user coverage area 215($i$)UA is depicted wider than the control coverage area 215($i$)CA, similar considerations apply in case the former is smaller than the latter, or in case the former is equal to the latter.

According to another embodiment of the present invention, instead of being U-plane nodes equipped with additional software and hardware resources such to make them capable to carry out (also) C-plane managing functions, the hybrid nodes 215(i) may be dedicated network nodes specifically designed to be switched between the abovementioned user modality and control modality.

According to an embodiment of the present invention the hybrid nodes 215(i) can be configured to be switched from the user modality to two different control modalities, referred to as complete-control modality and shared-control modality.

When a hybrid node 215(i) is switched to the complete-control modality, it ceases to operate as a U-plane node—thus ceasing to manage user traffic—to operate instead as a C-plane node, for managing signaling traffic only. Since a hybrid node 215(i) that has been switched to the complete-control modality ceases to manage user traffic, the user equipment 110 that were connected to said hybrid node 215(i) for exchanging user traffic before the switching need to be handed over to surrounding U-plane nodes 115(i) by means of known handover procedures.

When a hybrid node 215(i) is switched to the shared-control modality, it operates as a C-plane node for managing signaling traffic, but at the same time it still maintains user traffic managing capabilities. Therefore, handover procedures are not necessarily carried out on user equipment 110 connected to the hybrid node 215(i).

Figure 3:
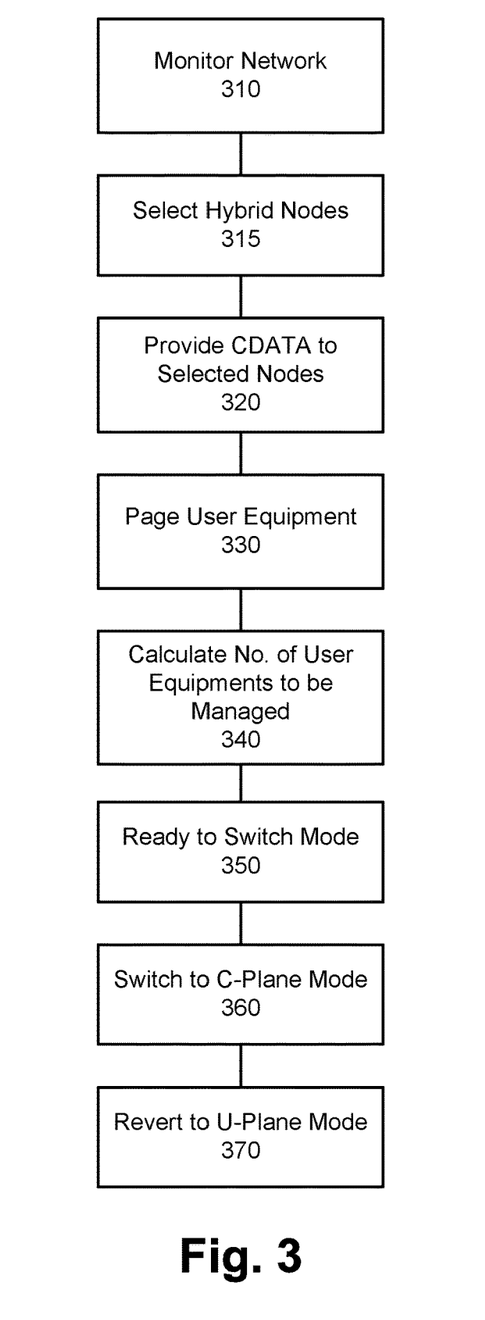
FIG. 3 is a flowchart of the main phases of a procedure for switching a hybrid node of the network of FIG. 2 from a user modality to a control modality according to an embodiment of the present invention.

FIG. 3 is a flowchart 300 illustrating in terms of functional blocks the main phases of a procedure for switching a hybrid node 215(i) from the user modality to the control modality (both the complete-control modality and the shared-control modality) and vice versa according to an embodiment of the present invention.

According to an embodiment of the present invention, the procedure illustrated by means of the flowchart 300 makes use of the concept of "activity map". According to an embodiment of the present invention, when correctly operating, each C-plane node 105 is configured to update and use a pertaining activity map, locally or/and remotely stored. The activity map of a C-plane node 105 is a data collection, for example arranged in the form of a data structure, comprising a record for each one of the user equipment 110 within its coverage area 105A. Each record of the activity map comprises the whole set of information relevant to the management of a respective user equipment 110, as well as information relating to the operation condition thereof (i.e., indicating whether said user equipment 110 is generating traffic or is idle, its capabilities and its service profile).

According to an embodiment of the present invention, the activity maps of all the C-plane nodes 105 are stored in a network element of the decoupled network 100' (e.g., a network element of the decoupled network 100' performing tasks as, for example, the Mobility Management Entity (MME) in current LTE architecture). According to an embodiment of the present invention, the activity map may be also stored in the hybrid nodes 215(i) operating as C-plane nodes in control modality.

The first phase of the procedure (block 310) according to an embodiment of the present invention provides for monitoring the decoupled network 100' for detecting any occurrence of C-plane node malfunctioning, identifying whether there is any C-plane node 105 that is under congestion or breakdown.

According to an embodiment of the present invention, a C-plane node malfunctioning may be detected by a control system of the decouple network, such as the O&M (Operation and Maintenance), and/or through user equipment 110 that have lost link with C-plane nodes 105. In the second case, as an example, a lack of C-plane link could be detected by user equipment 110 and notified to the O&M through the U-plane.

In case the detected C-plane node malfunctioning is a C-plane node congestion, it means that a signaling congestion has occurred, and the malfunctioning C-plane node 105 is no more able to guarantee further signaling traffic increasing, manage incoming new user equipment, serve user equipment requiring camping or serve camped user equipment requiring a service, in its whole coverage area 105A, or in a portion (e.g., a sector) thereof.

In case the detected C-plane node malfunctioning is a C-plane node breakdown, it means that a hardware or software fault has occurred, and the whole coverage area 105A, or a portion (e.g., a sector) thereof of the malfunctioning C-plane node 105 may become out of service.

The second phase of the procedure (block 315) according to an embodiment of the present invention provides for selecting a set of hybrid nodes 215(i) to be switched to the control modality in response to the detected C-plane node malfunctioning for temporally substituting and/or supporting the malfunctioning C-plane node 105.

In case the detected C-plane node malfunctioning is a C-plane node congestion, the set of hybrid nodes 215(i) can be selected by the malfunctioning C-plane node 105, or the O&M, among the hybrid nodes 215(i) located in its coverage area 105A. The hybrid nodes 215(i) whose user coverage areas 215(i)UA correspond to the portion(s) of the coverage area 105A wherein the signaling congestion has occurred, are selected. For example, if the signaling congestion has occurred only in a sector of the coverage area 105A, only the hybrid nodes 215(i) located within said sector are selected; if instead the signaling congestion has occurred in the whole coverage area 105A, all the hybrid nodes 215(i) located within the coverage area 105A may be selected.

In case the detected C-plane node malfunctioning is a C-plane node breakdown, as soon as the C-plane node malfunctioning is detected, the O&M system selects a set of hybrid nodes 215(i) among those located in the coverage area 105A of the malfunctioning C-plane node 105. In this case as well, the O&M system selects the hybrid nodes 215(i) whose user coverage areas 215(i)UA correspond to the portion(s) of the coverage area 105A that are out of service. For example, if only a sector of the coverage area 105A is out of service, the O&M system may select only the hybrid nodes 215(i) located within said sector; if instead the whole coverage area 105A is out of service, the O&M system may select all the hybrid nodes 215(i) located within the coverage area 105A.

The next phase of the procedure (block 320) according to an embodiment of the present invention comprises providing the selected hybrid nodes 215(i) with configuration data CDATA to be exploited after the switching to the control modality. In case the detected C-plane node malfunctioning is a C-plane node congestion, the configuration data CDATA may be provided to the selected hybrid nodes 215(i) either by the malfunctioning C-plane node 105 or by the O&M system. In case instead the detected C-plane node malfunctioning is a C-plane node breakdown, the configuration data CDATA are made available to the selected hybrid nodes 215(i) by the O&M system.

According to an embodiment of the present invention, the configuration data CDATA provided to each selected hybrid node 215(i) can comprise:

A list of the various C-plane frequency bands to be exploited by the selected hybrid node 215(i) after the switching to the control modality.

A list of the hybrid nodes 215(i) adjacent to the selected hybrid node 215(i). In case the selected hybrid node 215(i) is located at the border of the coverage area 105A of the malfunctioning node 105, the list may further comprise neighbor C-plane nodes 105. Moreover, in case the detected C-plane node malfunctioning is a C-plane congestion, the list may still further comprise the malfunctioning C-plane node 105.

The section of the activity map of the malfunctioning C-plane node 105 (i.e., the most updated version before the C-plane node malfunctioning has occurred) corresponding to the user equipment 110 that are actually generating traffic in portions of the coverage area 105A that will be assigned to said selected hybrid node 215(i) for the signaling traffic management.

It has to be appreciated that while the locations (within the coverage area 105A) of the user equipment 110 that are generating traffic are known, at least from the U-plane point of view, the locations of the user equipment 110 that are in the idle condition need to be determined, to estimate the amount of C-plane resources to be destined to the hybrid node 215(i), for example, by means of a paging operation specific for this purpose. For this purpose, the next phase of the procedure (block 330) provides that each selected hybrid node 215(i) carries out a paging operation on the user equipment 110 that are listed in the activity map of the malfunctioning C-plane node 105 as in the idle condition.

In the next phase of the procedure (block 340), based on the available section of the activity map, following the paging operations, and taking into account that the position, the coverage performance per frequency band, and the signaling traffic capacity of the hybrid nodes 215(i) are known in advance (being determined by the architecture of the decoupled network 100), each selected hybrid node 215(i) calculates which subset UESET of the user equipment 110 located within the coverage area 105A of the malfunctioning C-plane node 105 it will have to manage after the switching to the control modality.

According to another embodiment of the present invention, the C-plane resources estimation can be performed by the hybrid node 215(i) during its operation, in such a way to dynamically adapt to the actual situation of the decoupled network 100.

When a hybrid node is provided with the configuration data CDATA, and after having determined the subset UESET of user equipment 110 to be managed in the control modality, it assumes a "ready-for switching-modality" status, providing, at least initially, a corresponding notification to the O&M (block 350).

Each hybrid node 215(i) in the ready-for-switching-modality status is configured to pre-activate all its hardware and software resources required to actually carry out the switching from the user modality to the control modality. In case at least a portion of the software resources is not directly available, the hybrid nodes 215(i) can download it from a repository.

The following phase of the procedure according to an embodiment of the present invention (block 360) provides that the hybrid nodes 215(i) in the ready-for-switching-modality status actually switch from the user modality to the control modality as soon as a switching command is sent by the O&M.

As already mentioned above, according to an embodiment of the present invention each hybrid node 215(i) is configured to switch from the user modality to two different control modalities, i.e., a complete-control modality, wherein the hybrid node 215(i) ceases to operate as a U-plane node—thus ceasing to manage user traffic—to operate instead as a C-plane node, for managing signaling traffic only, and a shared-control modality, wherein the hybrid node 215(i) operates as a C-plane node for managing signaling traffic, but at the same time it still maintains user traffic managing capabilities. The two modalities will be now analyzed.

Complete-Control Modality

It is assumed that after the switching of a hybrid node 215(i) to the complete-control modality, the user coverage 215(i)UA that said hybrid node 215(i) covered before the switching can be served by neighboring U-plane nodes 115(i). According to an embodiment of the present invention, since a hybrid node 215(i) in the complete-control modality is no more able to manage user traffic, before actually switching to the complete-control modality, it starts coordination with neighboring C-plane nodes 105 and hybrid nodes 215(i) already in the control modality in order to steer user equipment 110 within the user coverage area 215(i)UA of said hybrid node 215(i) toward neighboring U-plane nodes 115(i) in order to allow said neighboring U-plane nodes 115(i) to manage user traffic. This operation may be performed, as an example, through handovers triggered by a load balancing procedure. Then, the hybrid node 215(i) actually switches to the complete-control modality, starting to manage the signaling traffic for the user equipment 110 of the set UESET of user equipment 110 pertaining to such hybrid node 215(i) within a corresponding control coverage area 215(i)CA by exploiting the hardware and software resources previously pre-activated.

User equipment 110 lacking of C-plane coverage starts a search for a new C-plane coverage by the search procedure and subsequent attach as usual in cellular networks.

Shared-Control Modality

The operations carried out by a hybrid node 215(i) that is switching to a shared-control modality correspond to the ones relating to the complete-control modality, with the exception that user equipment 110 within the user coverage area 215(i)UA of a hybrid node 215(i) that is about to switch to the shared-control modality are not handed over to neighboring U-plane nodes 115(i) for the user traffic management, since a hybrid node 215(i) switched to the shared-control modality is still able to carry out user traffic management. However, since a hybrid node 215(i) in the shared-control modality may have a reduced user traffic managing capacity, if the user traffic load exceeds a threshold, according to an embodiment of the present invention a user traffic load balancing procedure may be additionally carried out, still providing for handing over some user equipment 110 toward other U-plane nodes 115(i) for the user traffic managing.

It has to be appreciated that during the operation of a hybrid node 215(i) switched to the control modality (both complete and shared), the hybrid node 215(i) continuously updates a corresponding activity map as a normal C-plane node 105.

The following phase of the procedure (block 370) provides for switching back the hybrid nodes 215(i) to the user modality once the C-plane node malfunctioning (e.g., congestion or breakdown) ends and the malfunctioning C-plane node 105 restarts to correctly operate.

According to an embodiment of the present invention, as soon as the C-plane node malfunctioning (e.g., congestion or breakdown) is terminated, the C-plane node 105 sends a notification to the hybrid nodes 215(*i*) in the control modality through the O&M system. Then, the O&M system instructs said hybrid nodes 215(*i*) to notify their current activity maps to the C-plane node 105, and to carry out a signaling handover for re-assigning the management of the signaling traffic for the user equipment 110 to the C-plane node 105. The O&M system then commands the hybrid nodes 215(*i*) in the control modality to release the hardware and/or software resources. Finally, the O&M system commands the switching, and the hybrid nodes 215(*i*) in the control modality actually switch back to the user modality.

According to an embodiment of the present invention, the switch back of some hybrid nodes 215(*i*) from the control modality to the user modality may be performed as soon as the load condition of the C-plane node 105 allows it; at this point, the C-plane node 105 may carry out a signaling traffic load balancing procedure, by coordinating itself with the remaining hybrid nodes 215(*i*).

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment as a matter of general design choice.

The invention claimed is:

1. A cellular network comprising:
   a plurality of control plane transceiver stations, each one configured to provide radio coverage over a corresponding first coverage area to allow user equipment within said first coverage area to exchange control-plane traffic with the control plane transceiver station, the plurality of control plane transceiver stations exchanging only control-plane traffic with the user equipment;
   wherein
   for each control plane transceiver station, the cellular network further comprises one or more hybrid transceiver stations located within the corresponding first coverage area, each hybrid transceiver station being configured to be switched between:
   a) a user operation modality, in which said hybrid transceiver station is configured to provide radio coverage over a corresponding user coverage area to allow user equipment within said user coverage area to exchange user-plane traffic with the hybrid transceiver station, and
   b) a control operation modality, in which said hybrid transceiver station is configured to provide radio coverage over a corresponding control coverage area to allow user equipment within said control coverage area to exchange at least control-plane traffic with the hybrid transceiver station.

2. The cellular network of claim 1, wherein said control operation modality comprises a complete-control modality, a hybrid transceiver station in the complete-control modality being configured to cease to provide radio coverage over the corresponding user coverage area to cease to allow user equipment within said user coverage area to exchange user-plane traffic with the hybrid transceiver station.

3. The cellular network of claim 1, wherein said control operation modality comprises a shared-control modality, a hybrid transceiver station in the shared-control modality being configured to provide radio coverage over the corresponding control coverage area to allow user equipment within said control coverage area to exchange at least control-plane traffic with the hybrid transceiver station, and to provide radio coverage over the corresponding user coverage area to allow user equipment within said user coverage area to exchange user-plane traffic with the hybrid transceiver station.

4. The cellular network of claim 1, wherein a hybrid transceiver station located within the first coverage area of a control plane transceiver station is configured to be switched to the control operation modality when said control plane transceiver station is in a malfunctioning condition.

5. The cellular network of claim 4, wherein said malfunctioning condition comprises a congestion condition in terms of control-plane traffic to be managed, a control plane transceiver station in a congestion condition being unable to:
   guarantee further control-plane traffic increase;
   manage incoming new user equipment;
   serve user equipment requiring camping, or
   serve camped user equipment requiring a service, in at least a portion of its corresponding first coverage area.

6. The cellular network of claim 4, wherein said malfunctioning condition comprises a congestion condition in terms of control-plane traffic to be managed, a control plane transceiver station in a congestion condition being unable to:
   guarantee further control-plane traffic increase;
   manage incoming new user equipment;
   serve user equipment requiring camping, and
   serve camped user equipment requiring a service,
   in at least a portion of its corresponding first coverage area.

7. The cellular network of claim 4, wherein said malfunctioning condition comprises a breakdown condition, a control plane transceiver station in a breakdown condition being affected by at least one of a hardware or software fault that causes at least a portion of its corresponding first coverage area to be out of service.

8. The cellular of claim 4, wherein:
   each control plane transceiver station is configured to update a corresponding data collection comprising, for each user equipment within its corresponding first coverage area, information relating to an operation condition of said user equipment, and to provide a corresponding portion of said data collection to selected hybrid transceiver stations located within the first coverage area;
   before switching to the control operation modality when a control plane transceiver station is in a malfunctioning condition, a selected hybrid transceiver station located within the first coverage area of said control plane transceiver station in a malfunctioning condition is configured to select a subset of user equipment located within the first coverage area of said control plane transceiver station in a malfunctioning condition based on the corresponding portion of said data collection received from said control plane transceiver station in a malfunctioning condition, and after being switched to the control operation modality, said selected hybrid transceiver station is configured to exchange at least control-plane traffic with the user equipment of said subset.

9. The cellular network of claim 2, further comprising for each control plane transceiver station one or more user plane transceiver stations located within the corresponding first coverage area, each user plane transceiver station being configured to provide radio coverage over a corresponding second coverage area to allow user equipment within said second coverage area to exchange user-plane traffic with the user plane transceiver station.

10. The cellular network of claim 9, wherein, before switching to the complete-control modality, a hybrid transceiver station is configured to start coordination with neighboring control plane transceiver stations and with neighboring hybrid transceiver stations already in the control operation modality to steer user equipment within the user coverage area of said hybrid transceiver station toward neighboring user plane transceiver stations to enable said neighboring user plane transceiver stations to exchange user-plane traffic with said user equipment.

11. The cellular network of claim 9, wherein said one or more hybrid transceiver stations are user plane transceiver stations equipped with at least one of software or hardware resources selectively operable to exchange at least control-plane traffic with user equipment.

* * * * *